United States Patent
Juretic et al.

(10) Patent No.: US 11,106,499 B2
(45) Date of Patent: *Aug. 31, 2021

(54) RESOURCE ALLOCATION BASED ON RESOURCE DISTRIBUTION DATA FROM CHILD NODE

(71) Applicant: The Toronto-Dominion Bank, Toronto (CA)

(72) Inventors: Victoria Juretic, Toronto (CA); Xiaotian Fan, Toronto (CA); Basil Chan, Markham (CA); Stephen Banquier, Toronto (CA); John Jong-Suk Lee, Toronto (CA)

(73) Assignee: The Toronto-Dominion Bank, Toronto (CA)

(*) Notice: Subject to any disclaimer, the term of this patent is extended or adjusted under 35 U.S.C. 154(b) by 0 days.

This patent is subject to a terminal disclaimer.

(21) Appl. No.: 16/594,392

(22) Filed: Oct. 7, 2019

(65) Prior Publication Data

US 2020/0034198 A1 Jan. 30, 2020

Related U.S. Application Data

(63) Continuation of application No. 15/726,726, filed on Oct. 6, 2017, now Pat. No. 10,474,499.

(Continued)

(51) Int. Cl.
*G06F 9/50* (2006.01)
*G06F 11/07* (2006.01)

(52) U.S. Cl.
CPC .............. *G06F 9/50* (2013.01); *G06F 9/5011* (2013.01); *G06F 9/5016* (2013.01);
(Continued)

(58) Field of Classification Search
None
See application file for complete search history.

(56) References Cited

U.S. PATENT DOCUMENTS 7,657,477 B1 * 2/2010 Chaffee .................. G06Q 40/06
                                                                                   463/1
2007/0226332 A1 9/2007 Becker-Szendy et al.
(Continued)

OTHER PUBLICATIONS

U.S. Office Action dated Apr. 9, 2019, U.S. Appl. No. 15/726,726.
(Continued)

*Primary Examiner* — Qing Chen
(74) *Attorney, Agent, or Firm* — Rowand LLP

(57) ABSTRACT

A method for allocating a resource associated with a root node is disclosed. The method includes: obtaining resource distribution data, wherein the resource distribution data indicates a proportional distribution of resources among one or more descendant nodes of a child node of the root node; and allocating the resource to the one or more descendant nodes of the child node by: determining a total amount of resources allocated to the child node; based on the resource distribution data, allocating respective portions from the total amount of resources allocated to the child node to the one or more descendant nodes of the child node; and automatically generating reports for the one or more descendant nodes of the child node based on respective amount of resources allocated to the one or more descendant nodes of the child node.

22 Claims, 9 Drawing Sheets

Related U.S. Application Data

(60) Provisional application No. 62/465,208, filed on Mar. 1, 2017.

(52) U.S. Cl.
CPC .......... *G06F 9/5027* (2013.01); *G06F 9/5061* (2013.01); *G06F 11/0784* (2013.01)

(56) References Cited

U.S. PATENT DOCUMENTS

| | | |
|---|---|---|
| 2009/0094605 A1 | 4/2009 | Breslford et al. |
| 2011/0246389 A1 | 10/2011 | Ziolek et al. |
| 2012/0054721 A1 | 3/2012 | Dadiomov et al. |
| 2013/0288673 A1 | 10/2013 | Le et al. |
| 2013/0326064 A1 | 12/2013 | Gulati et al. |
| 2015/0263902 A1 | 9/2015 | He et al. |
| 2016/0196168 A1* | 7/2016 | Koizumi ............... G06F 9/5077 718/104 |
| 2018/0026910 A1 | 1/2018 | Balle et al. |

OTHER PUBLICATIONS

CIPO, Examiners Report relating to application No. 2,981,842 dated Nov. 9, 2020.

\* cited by examiner

| Investment Co. | HOME | DOCUMENTATION | FUNDS ▼ | | | | | | | | ERIC FAN | ⬅ LOG OUT |

Test
TESTING
⊗ Under Review
Total Allocation 100%

[Show All ▼] [Search investors]
[Expand All] [Collapse All]

| Investor Name | Status | Address | City | Country | Prov/ State | Postal Code | US TIN | TIN Type | Foreign Tax ID | Allocation % | Expiry Date | Document Type | Residency Code |
|---|---|---|---|---|---|---|---|---|---|---|---|---|---|
| ▪ Person 1 | ⊗ | Street 1 | City 1 | PO | | | | | | | | | |
| ▪ Person 2 | ⊗ | Street 2 | City 2 | FR | | | | | | | | | |
| ◄ Person 5 | ⊗ | Street 5 | City 5 | MG | | | | | | 45 | | | |
| ◄ Person 3 | ⊗ | Street 3 | City 3 | UK | | | | | | 30 | | | |
| ◄ Person 4 | ⊗ | Street 4 | City 4 | JA | | | | | | 25 | | | |

RESOURCE ALLOCATION BASED ON RESOURCE DISTRIBUTION DATA FROM CHILD NODE

CROSS-REFERENCE TO RELATED APPLICATIONS

The present application is a continuation of U.S. patent application Ser. No. 15/726,726 (now U.S. Pat. No. 10,474,499) filed on Oct. 6, 2017, the contents of which are hereby incorporated by reference.

TECHNICAL FIELD

The present application relates to resource allocation and, more particularly, to systems and methods for allocating resources by a root node of a network. Systems and methods described herein may be suitable for allocating a computing or other resource to leaf nodes in a network.

BACKGROUND

Shared resources, such as processing resources or memory that may be shared among a plurality of nodes, are typically finite. Systems that share a pool of resources may not efficiently utilize such resources or may not accurately allocate such resources. Inefficient or inaccurate allocation of resources may result in too many or too few resources being allocated to a given node.

Further, while resources are finite at any given moment, the pool of resources may expand or contract over time or the nodes which share such resources may change. For example, new memory or processing capacity may be added to a system or a particular node may be added or removed from the network. Changes to the manner by which resources are allocated may lag such changes to the pool of resources or the nodes that are to share such resources.

Thus, there is a need for improved methods and systems for allocating resources.

BRIEF DESCRIPTION OF THE DRAWINGS

Embodiments are described in detail below, with reference to the following drawings:

FIG. 6 is an example first relationship management user interface screen;

FIG. 7 is an example second relationship management user interface screen;

FIG. 8 illustrates an example third relationship management user interface screen;

FIG. 9 is an example fourth relationship management user interface screen; and

Like reference numerals are used in the drawings to denote like elements and features.

DETAILED DESCRIPTION OF VARIOUS EMBODIMENTS

Figure 1:
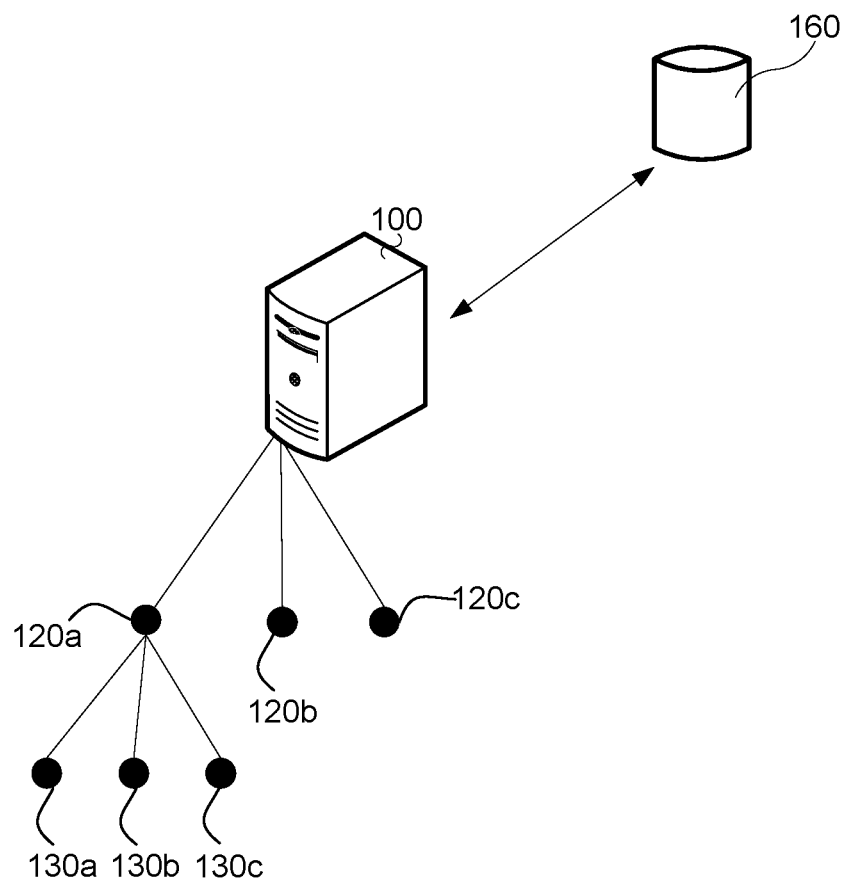
FIG. 1 is a schematic operation diagram illustrating an operating environment of an example embodiment.

In one aspect, there is provided a computer system for allocating a resource associated with a root node. The computer system includes a processor and a communications module coupled to the processor. The computer system also includes a storage module coupled to the processor and a memory coupled to the processor. The memory stores instructions that, when executed by the processor, cause the computer system to: obtain resource distribution data, wherein the resource distribution data indicates a proportional distribution of resources among one or more descendant nodes of a child node of the root node; and allocate the resource to the one or more descendant nodes of the child node by: determining a total amount of resources allocated to the child node; based on the resource distribution data, allocating respective portions from the total amount of resources allocated to the child node to the one or more descendant nodes of the child node; and automatically generating reports for the one or more descendant nodes of the child node based on respective amount of resources allocated to the one or more descendant nodes of the child node.

In another aspect, there is provided a computed-implemented method for allocating a resource associated with a root node. The method includes: obtaining resource distribution data, wherein the resource distribution data indicates a proportional distribution of resources among one or more descendant nodes of a child node of the root node; and allocating the resource to the one or more descendant nodes of the child node by: determining a total amount of resources allocated to the child node; based on the resource distribution data, allocating respective portions from the total amount of resources allocated to the child node to the one or more descendant nodes of the child node; and automatically generating reports for the one or more descendant nodes of the child node based on respective amount of resources allocated to the one or more descendant nodes of the child node.

In another aspect, there is provided a non-transitory computer-readable storage medium storing instructions that, when executed by a processor of a computer system, cause the computer system to: obtain resource distribution data, wherein the resource distribution data indicates a proportional distribution of resources among one or more descendant nodes of a child node of a root node; and allocate a resource associated with the root node to the one or more descendant nodes of the child node by: determining a total amount of resources allocated to the child node; based on the resource distribution data, allocating respective portions from the total amount of resources allocated to the child node to the one or more descendant nodes of the child node; automatically generating reports for the one or more descendant nodes of the child node based on respective amount of resources allocated to the one or more descendant nodes of the child node.

It may be desirable to efficiently and accurately allocate a resource such as a memory resource, processing resource or tradable object. A system which controls the resource and which may be referred to as a root node may allocate the resource but, in doing so, may rely on resource distribution data received from a lower-level system, which may be referred to as a child node. The child node may have descendants and the resource distribution data received from a particular child node may allocate resources to the descendants of that child. The system may adapt quickly to changes such as changes in the total amount of resources and may also be highly scalable. Some or all of the above potentially desirable features may be provided by some embodiments.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a schematic operation diagram illustrating an operating environment of an example embodiment.

A system 100, which may be referred to as a root node or root node system, may be used to allocate a resource that is associated with that root node. The system 100 is a computer system and the resource may, for example, be a computing such as processing resources or memory resources. By way of example, the resource may be computer storage 160, which may be any type of computer-readable memory.

As will be described in greater detail below, the system 100 may be configured for communication with one or more child nodes 120a, 120b, 120c. The child nodes 120a, 120b, 120c are nodes associated with a hierarchical model and each child node is associated with a child in a hierarchical model. That is, the nodes may be organized in a tree-like structure in which the root node (e.g., the system 100) forms an uppermost (i.e. top) level and various children (which may be provided by or associated with child nodes 120a, 120b, 120c) are linked to the root node and are allocated resources by the root node.

One or more of the children may be a leaf, which is a node with no children. By way of example, in FIG. 1, a second child node 120b and third child node 120c are leaf nodes that have no descendants of their own. However, one or more of the child nodes 120a, 120b, 120c may have its own children. For example, a first child node 120a is illustrated as having three descendants—a first descendant 130a, a second descendant 130b and a third descendent 130c.

While the child nodes 120a, 120b, 120c of the root node and their descendants 130a, 130b, 130c are illustrated with circles in FIG. 1, one or more of these nodes may be provided by or associated with a computing device. For example, the child nodes 120a, 120b, 120c may be computing devices that are configured for communicating with the root node (i.e., the system 100). Similarly, the descendants 130a, 130b, 130c may be provided by or associated with a computing device. For example, the descendants (which may be referred to as descendent nodes) may be configured for communicating with a respective parent node which, in the example, is the first child node 120a.

As will be described in greater detail below, the system 100 may allocate a resource to one or more child nodes 120a, 120b, 120c and/or descendants 130a, 130b, 130c. That is, a resource may be allocated to parties, such as the child nodes 120a, 120b, 120c and/or descendants 130a, 130b, 130c that are beneath the root node in the hierarchical model. For example, the resource (which may be computer storage 160, a processing resource, etc.) may be allocated by the computer system 100 to child nodes 120a, 120b, 120c and/or descendants 130a, 130b, 130c of such child nodes. The system 100 may, therefore, allocate at least some resources to parties (such as a descendant 130a, 130b, 130c of a child node 120a) that are not a child of a root node. That is, at least some of the resources (such as a portion of the computer storage 160) may be set aside for a particular one of the descendants 130a, 130b, 130c of the child node 120a even though the descendant is not a direct child of the root node (i.e., of the system 100).

To allow the system 100 to accurately and efficiently allocate resources, mid-level nodes (i.e., nodes that are neither a leaf nor a root) may submit resource distribution data to the system 100. This resource distribution data may be used by the system 100 when allocating resources. For example, resource distribution data provided by a child node may define the relative amount of resources that are to be allocated to each descendant of that child node. By way of example, resource distribution data provided by a child (e.g., the first child node 120a) may indicate that a first descendant 130a is to be allocated 30% of any resource allocated to that child, a second descendant 130b is to be allocated 60% of any resource allocated to that child, and a third descendent 130c is to be allocated 10% of any resource allocated to that child. The resource distribution data may provide a complete assignment of resources. That is, the resource distribution data may assign all resources that have been allocated to a given child to the descendants of that child. Put differently, the resource distribution data may assign one hundred percent of all resources allocated to a child to the descendants of that child.

Thus, the system 100, which forms a root node in a hierarchical model, may allocate resources to descendants which may not be directly coupled to the root node. The node which is immediately above the descendant in the hierarchical model may, however, control or influence how such resources are distributed among the child nodes by providing resource distribution data to the system 100.

Since the child node, which is more directly associated with the descendants than the root node itself, controls or influences how resources allocated to that child node should be re-allocated to its descendants, accurate and efficient allocation of resources may be provided in at least some scenarios and embodiments. For example, the root node need not, initially, have any stored data about the descendants beneath a given child node. Initially, the root node may simply allocate a portion of the resources each of its own children (e.g., the child nodes 120a, 120b, 120c) but may allow such children to add their own descendants and to sub-allocate that portion of the resources to such descendants. When a child node adds (or removes) descendants 130a, 130b, 130c, it can cause its share of resources to be sub-allocated to its own descendants. This distributed control may allow for ease of scalability since child nodes may simply add or remove descendants without pre-approval from the system 100. Further, changes may be accounted for very quickly since the child nodes monitor for changes in their descendants. The system 100 may, therefore, re-allocate resources quickly when changes in the hierarchical model occur even when there is a large number of leaves.

Figure 2:
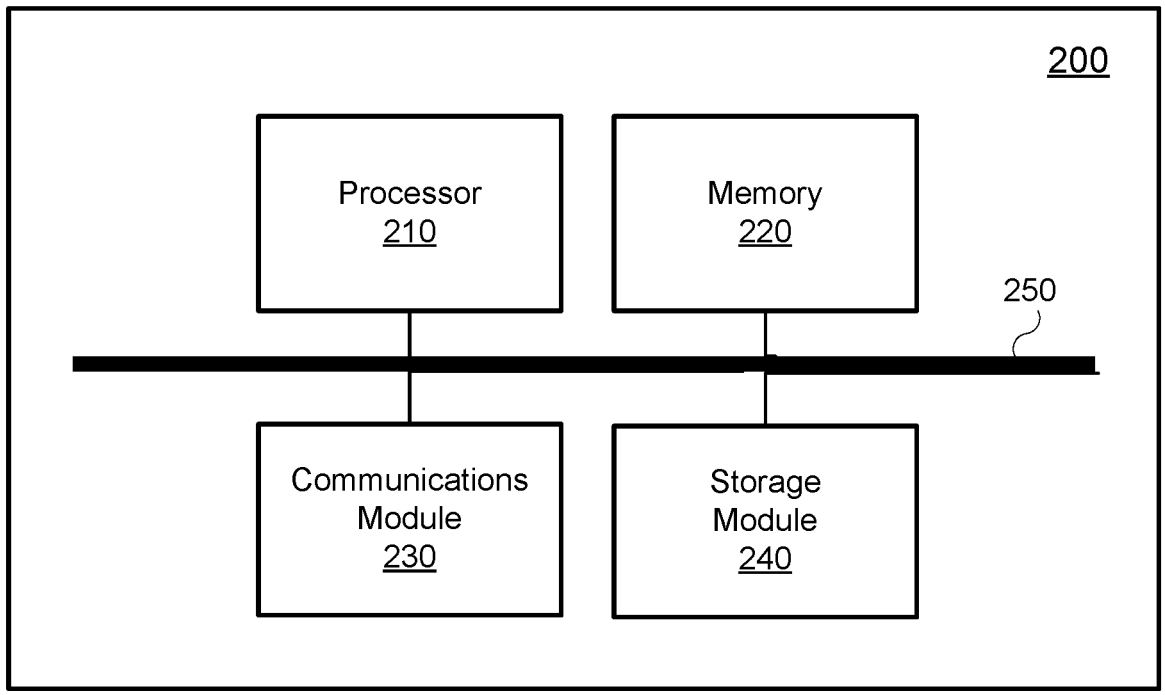
FIG. 2 is a high-level operation diagram of an example computing device.

FIG. 2 is a high-level operation diagram of an example computing device 200, which may also be referred to as a computing system, a computer system or a computer. In some embodiments, the example computing device 200 may be exemplary of one or more of the system 100, child nodes 120a, 120b, 120c (i.e., children of the root node) and/or descendants 130a, 130b, 130c of the child nodes 120a, 120b, 120c. As will be discussed in greater detail below, the system 100, child nodes 120a, 120b, 120c (i.e., children of the root node) and/or descendants 130a, 130b, 130c of the child nodes 120a, 120b, 120c may include software that adapts it to perform a particular function. More particularly, software of each of the system 100 and child nodes 120a, 120b, 120c (i.e., children of the root node) cooperates, with communication between the system 100 and child nodes 120a, 120b, 120c (i.e., children of the root node) via some manner of computer network, in order to allocate resources to one or more of the descendants 130a, 130b, 130c.

The example computing device 200 includes a variety of modules. For example, as illustrated, the example computing device 200 may include a processor 210, a memory 220, a communications module 230, and a storage module 240. As illustrated, the foregoing example modules of the example computing device 200 are in communication over a bus 250.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 200.

The communications module 230 allows the example computing device 200 to communicate with other computing devices and/or various communications networks. For example, the communications module 230 may allow the example computing device 200 to send or receive communications signals. Communications signals may be sent or received according to one or more protocols or according to one or more standards. For example, the communications module 230 may allow the example computing device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 230 may allow the example computing device 200 to communicate using near-field communication (NFC), via Wi-Fi™, using Bluetooth™ or via some combination of one or more networks or protocols. In some embodiments, all or a portion of the communications module 230 may be integrated into a component of the example computing device 200. For example, the communications module may be integrated into a communications chipset.

The storage module 240 allows the example computing device 200 to be stored and retrieved. In some embodiments, the storage module 240 may be formed as a part of the memory 220 and/or may be used to access all or a portion of the memory 220. Additionally or alternatively, the storage module 240 may be used to store and retrieve data from persisted storage other than the persisted storage (if any) accessible via the memory 220. In some embodiments, the storage module 240 may be used to store and retrieve data in a database. A database may be stored in persisted storage. Additionally or alternatively, the storage module 240 may access data stored remotely such as, for example, as may be accessed using a local area network (LAN) and/or a storage area network (SAN). In some embodiments, the storage module 240 may access data stored remotely using the communications module 230. In some embodiments, the storage module 240 may be omitted and its function may be performed by the memory 220 and/or by the processor 210 in concert with the communications module 230 such as, for example, if data is stored remotely.

Software comprising instructions is executed by the processor 210 from a computer-readable medium. For example, software may be loaded into random-access memory from persistent storage of the memory 220. Additionally or alternatively, instructions may be executed by the processor 210 directly from read-only memory of the memory 220.

Figure 3:
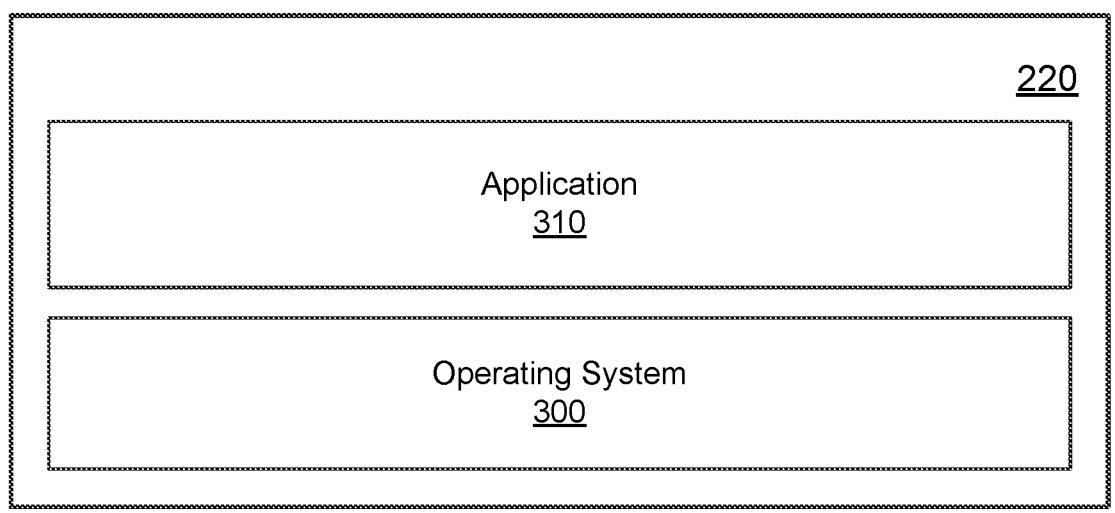
FIG. 3 depicts an example simplified software organization of the example computing device of FIG. 2.

FIG. 3 depicts a simplified organization of software components stored in the memory 220 of the example computer device 200. As illustrated these software components include an operating system 300 and an application 310.

The operating system 300 is software. The operating system 300 allows the application 310 to access the processor 210, the memory 220, and the communications module 230. The operating system 300 may be, for example, UNIX™, Linux™, Microsoft™ Windows™, Apple OSX™ or the like.

The application 310 adapts the example computing device 200, in combination with the operating system 300, to operate as a device to a particular function. For example, the application 310 may cooperate with the operating system 300 to adapt a suitable embodiment of the example computing device 200 to operate as the system 100, child nodes 120a, 120b, 120c (i.e., children of the root node) and/or descendants 130a, 130b, 130c of the child nodes 120a, 120b, 120c. For example, the application 310 may adapt the example computing device 200 to cooperate with another computing device 200 to allocate resources using one or more methods described herein.

Figure 4:
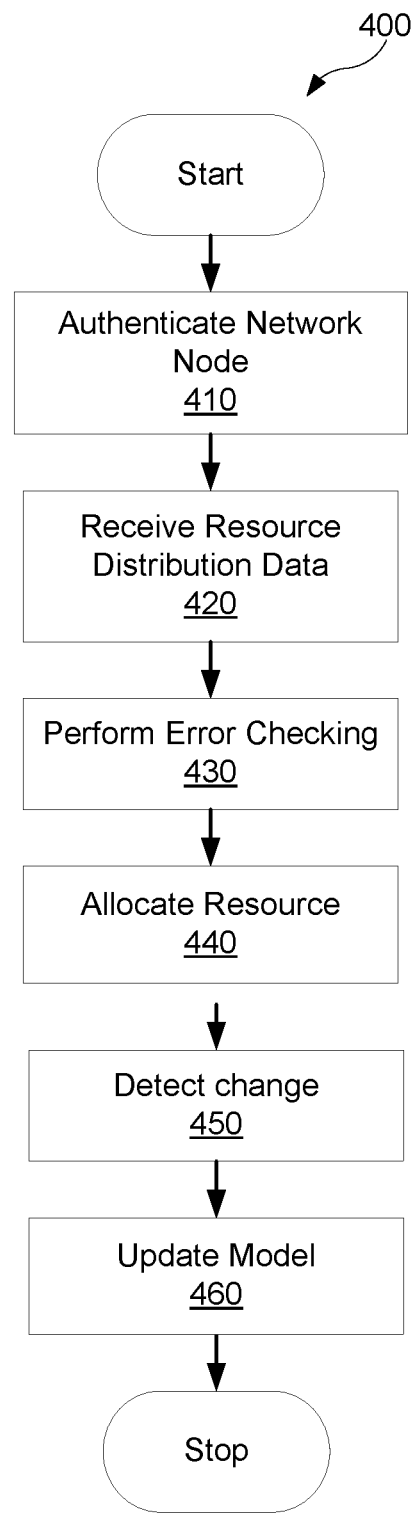
FIG. 4 is a flowchart depicting example operations performed by an electronic device to allocate a resource.

Referring now to FIG. 4, an example method 400 for allocating a resource will now be described. The resource is a resource that is associated with a root node, such as the system 100 of FIG. 1. The method 400 may be performed by one or more processors of a computing device, such as for example the processor 210 of a suitably configured instance of the example computing device 200, executing software such as, for example, a suitable instance of the application 310. More particularly, the method 400 may be performed to allocate a resource, such as a computing resource associated with a root node. The computing resource may be a processing resource or memory.

At operation 410 of the method 400, the system 100 authenticates a network node by determining that the network node is child node. That is, the system 100 authenticates a node that communicates with the system 100 over a network, such as the Internet. As noted previously, a child node is a node that is associated with a child (of the root node) in a hierarchical model. At operation 410, the system 100 may, for example, receive authentication information, such as username and/or password, etc., which allow the system 100 to confirm the identify of the node. More particularly, the system 100 confirms that the network node is, in fact, a network node that is a child of the root node in a hierarchical model. The authentication information received from the network node during operation 410 may have been configured for use with an account associated with the child prior to performance of operation 410 and, when operation 410 is performed, the system 100 may already have access to authentication data (such as a username and password) stored in memory associated with the system 100 and which may be retrieved at operation 410 to authenticate the node.

In some embodiments, the system 100 may be a web server which may, for example, provide an interface which allows network nodes, such as a child node 120*a*, 120*b*, 120*c* (FIG. 1) to interact with the system 100 via the web. For example, the system 100 may serve a webpage to the child node which allows the child node to login to the system 100 using a web browser. Authenticating a network node at operation 410 may, therefore, include sending an authentication webpage to the network node and receiving authentication information via the webpage.

After the network node is authenticated to confirm that the network node is a child node of the root node, at operation 420, the system 100 may receive, via the communications module and from the child node, a signal representing resource distribution data. The resource distribution data indicates a proportional distribution of resources among descendants of the child. The system 100 and the child node 120*a*, 120*b*, 120*c* are geographically distributed devices which are able to send data to one another (such as the resource distribution data) using respective communications modules. For example, the communications modules may allow such distributed devices to communicate with one another over the network. Despite their separation, the system 100 and the node with which it communications during the method 400 of FIG. 4, are able to communicate in real time or near real-time which allows for rapid allocation (or re-allocation as the case may be) of resources.

The resource distribution data allocates resources only among nodes that are descendants of the child providing such resource allocation data. Put differently, the resource distribution data provided by a given child node does not allocate resources to nodes in the hierarchical model which are not descendants of the given child node. Child nodes are only able to influence or control the manner by which the system 100 allocates resources to their own descendants.

In at least some embodiments, at operation 430, the system 100 performs error checking on the resource distribution data to confirm that the resource distribution data satisfies predetermined requirements. For example, the system 100 may require that the resource distribution data provide a complete assignment of resources. That is, the resource distribution data for a particular child may be required to allocate all resources for that child to descendants of that child. In such embodiments, performing the error checking on the resource distribution data may include determining that the resource distribution data provides a complete (i.e., 100%) assignment of resources. That is, the system 100 may, in performing error checking, determine that the resource distribution data allocates all resources that have been allocated to the child providing the resource distribution data. By way of example, in some instances the resource distribution data may be expressed as percentages representing respective shares for descendants and the system 100 may confirm that the percentages, in aggregate, total 100%.

While not illustrated in FIG. 4, when error checking fails, an error may be generated and the method may be aborted. The error may be generated at the system 100 and a suitable error message may be sent to the child node.

At operation 440, in response to receiving the signal representing the resource distribution data, the system 100 allocates the resource to descendants of the child. The resource may be allocated by determining a total amount of resources allocated to the child and, based on the resource distribution data, allocating respective portions from the total amount of resources allocated to the child to descendants of that child. For example, in at least some embodiments, the system 100 may determine a total amount of resources allocated to the child by obtaining child resource allocation data from a storage module. The child resource allocation data may define a relative amount of a pool of resources to be allocated to the child. Accordingly, the system 100 may store child resource allocation data (or have access to stored data) which defines respective resource allocations for each of the child nodes. The child resource allocation data may be expressed in absolute terms or relative terms. For example, the child resource allocation data may indicate that a given child is to be allocated a particular percentage of a total resource (e.g., 10%) or a particular quantity of a total resource (e.g., 10 gigabytes of memory, etc.). The child resource allocation data may have been defined prior to performance of the method 400. For example, the child resource allocation data may have been defined for a given child when that child purchased or committed to purchase a share of the total resource.

Accordingly, at operation 440, the child resource allocation data may be retrieved from memory to determine the total amount of resources allocated to the child (i.e., from the child from which the resource distribution data was received). From this total amount of resources allocated to the child, the system 100 may then use the resource distribution data received from the child to sub-allocate portions of these resources to the descendants of that child. By way of example, the child resource allocation data may indicate that 10 gigabytes of storage is to be allocated to a particular child and the resource distribution data may indicate that a first descendant 130*a* is to be allocated 30% of such resources, a second descendant 130*b* is to be allocated 60% of such resources, and a third descendent 130*c* is to be allocated 10% of such resources. In such circumstances, the first descendent may be allocated 3 gigabytes of the storage (i.e., 30% of 10 GB), the second descendant may be allocated 6 gigabytes of the storage (i.e., 60% of 10 GB) and the third descendant may be allocated 1 gigabyte of the storage (i.e., 10% of 10 GB).

In allocating the resource at operation 440 (for example, while allocating respective portions from the total amount of resources), the system may update, in a storage module, a hierarchical model (which may be a data model) based on the resource distribution data. The hierarchical model may be a model of resource distributions that effectively assigns a portion of the resources to a given one of the nodes. For example, the hierarchical model may provide a complete assignment of all resources.

While not illustrated in FIG. 4, the system 100 may be configured to use the hierarchical model that defines the allocation of resources to respective nodes when managing such resources. For example, where the resource is a computing resource, the system 100 may provide a node with exclusive use of a resource allocated to that node. By way of example, where the resource is a memory resource, the system 100 may allow a node (such as a descendent of a child node) to utilize an amount of that memory resource which is based on the portion that is assigned to that node.

After resources are allocated to nodes at operation 440, the system 100 may monitor for a change that affect such allocations. For example, the system 100 may monitor for the availability of a new resource (e.g., if a new resource becomes available), removal of an existing resource (e.g., if a resource becomes unavailable) or a change in the total amount of an existing resource. The system 100 may also monitor for a change in descendant nodes of a child (e.g., which may be determined by the system when updated resource distribution data is provided by a child). If the system detects (at operation 450) availability of a new resource or a change in the total amount of an existing resource, or a change in descendent nodes, or a removal of an existing resource, then the system may automatically update (at operation 460) the hierarchical model to account for such changes. In doing so, the system 100 may change the allocation of resources.

Since the system 100 is a computer device 200, it can quickly update the hierarchical model to account for changes. For example, updates may be made in real time or near real time following such changes. Rapid updates may help to ensure an efficient and accurate allocation of resources.

The methods and systems described herein may be used to allocate other types of resources apart from computing resources. For example, in at least some embodiments, the resources that are allocated may include tradable objects such as liquid tradable securities such as bonds, stocks, exchange-traded funds, exchange-traded commodities, exchange-traded notes, real estate investment trusts (REIT) and over-the-counter (OTC) securities. For example, the root node may be associated with a fund which holds such tradable objects. The techniques described herein may be used, for example, to prepare assessment reports such as, for example, taxation reports. For example, the system 100 that provides or is associated with the root node in a hierarchical model may be associated with the fund itself and the resources may represent all tradable objects held by such a fund. The child nodes may represent entities that have holdings within the fund and/or pass-through entities, such as secondary funds or partnerships which have holdings within the fund. Entities that have direct holdings within the fund may be considered to be leaf nodes and pass-through entities are child nodes that have descendants. The descendants are the ultimate holders of the fund that have subscribed to the fund by virtue of their holdings of a pass-through entity.

The systems and methods described herein may, for example, be used to provide rapid and accurate tracking of all parties which maintain either a direct or indirect interest in the fund. For example, the system may quickly adapt to changes in either fund holdings (e.g., when a tradable object is bought or sold) or to changes in the composition of holders of the fund, including both child nodes and descendants of such nodes. Notably, different investors may have different reporting requirements and each individual investor may require a directed tax reporting for their real-time holdings. In existing systems, there may be a difficulty reporting such data due to the complexity of presenting relationships between subsets of investors, the investing pools to which they belong (i.e., the child nodes), the tax implications for each fund, etc.

An overview having been provided, reference will now be made to FIG. 5, which illustrates, in block diagram form, an example method 500 for allocating a resource. The resource is a resource that is associated with a root node, such as the system 100 of FIG. 1 but in the example of FIG. 5, the resource is a tradable object. The method 400 may be performed by one or more processors of a computing device, such as for example the processor 210 of a suitably configured instance of the example computing device 200, executing software such as, for example, a suitable instance of the application 310.

The operations of the method 500 operate in a similar manner to the operations of the method 400 of FIG. 4. For example, at operation 510, the system 100 authenticates a network node to confirm that the network node is a child node. Operation 510 may operate in the manner described above with reference to operation 410 of the method 400 of FIG. 4. During operation 510, the system 100 may confirm that the network node is a pass-through node which has investments in a pool of resources controlled by the root node. The system 100 may confirm that the network node is a pass-through node by confirming that the network node has pre-registered with the system 100 as a pass-through node. As described above with reference to operation 410, authentication information may be received from the network node during operation 510 and used to authenticate the network node.

At operation 520, the system 100 receives resource distribution data. The resource distribution data is received from the authenticated network node in the manner described above with reference to operation 420 of the method 400 of FIG. 4. The system 100 may also receive, via a communications module and from the child node (i.e., the network node that has been authenticated as a child node), a signal representing metadata associated with one or more of the descendants of the child. The metadata may specify properties associated with the descendent, such as country information, an address, an identifier such as a taxpayer identification number, a taxpayer identification number type, a foreign tax identifier, an expiry date, a document type, and/or a residency code.

Figure 7:
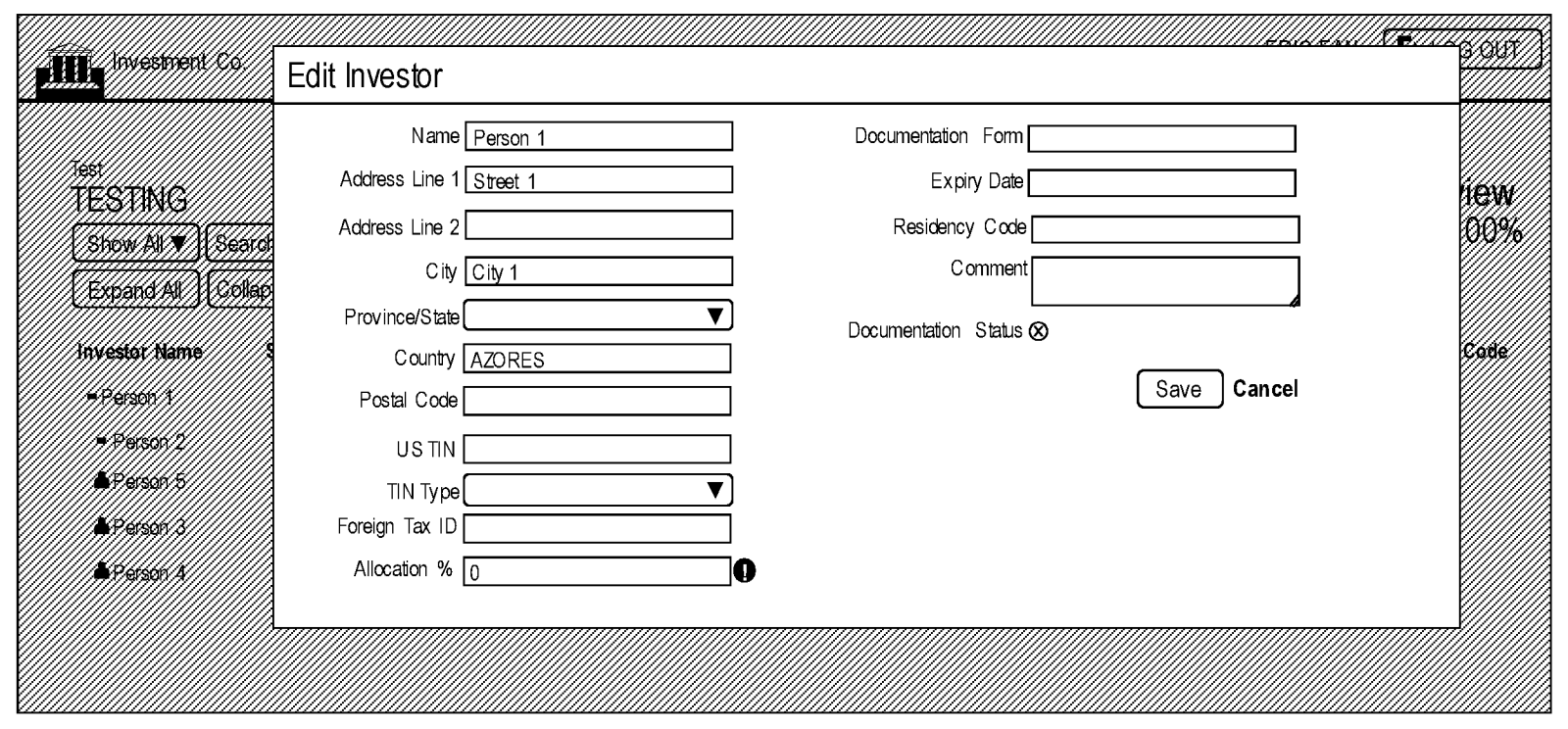
Figure 8:
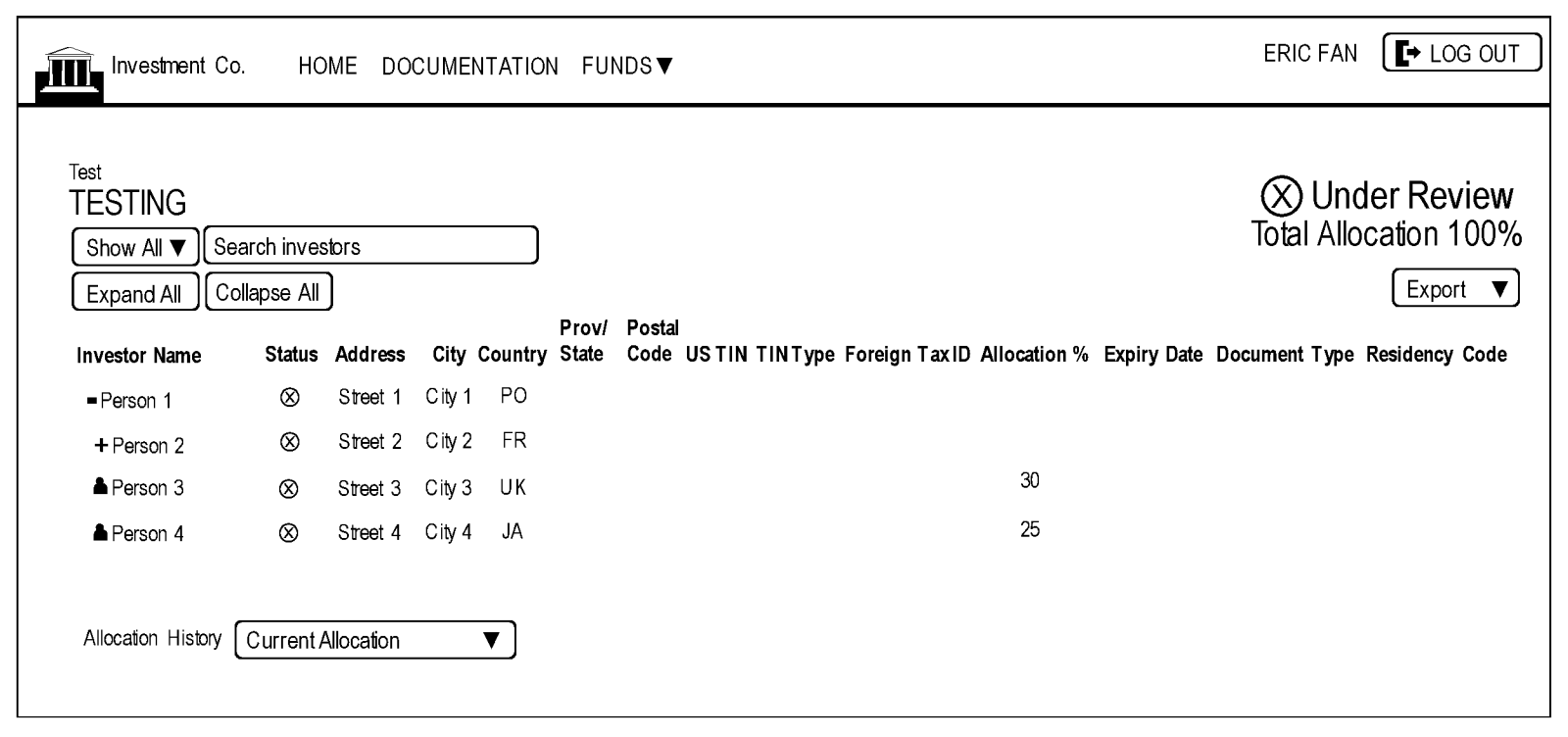
Figure 9:
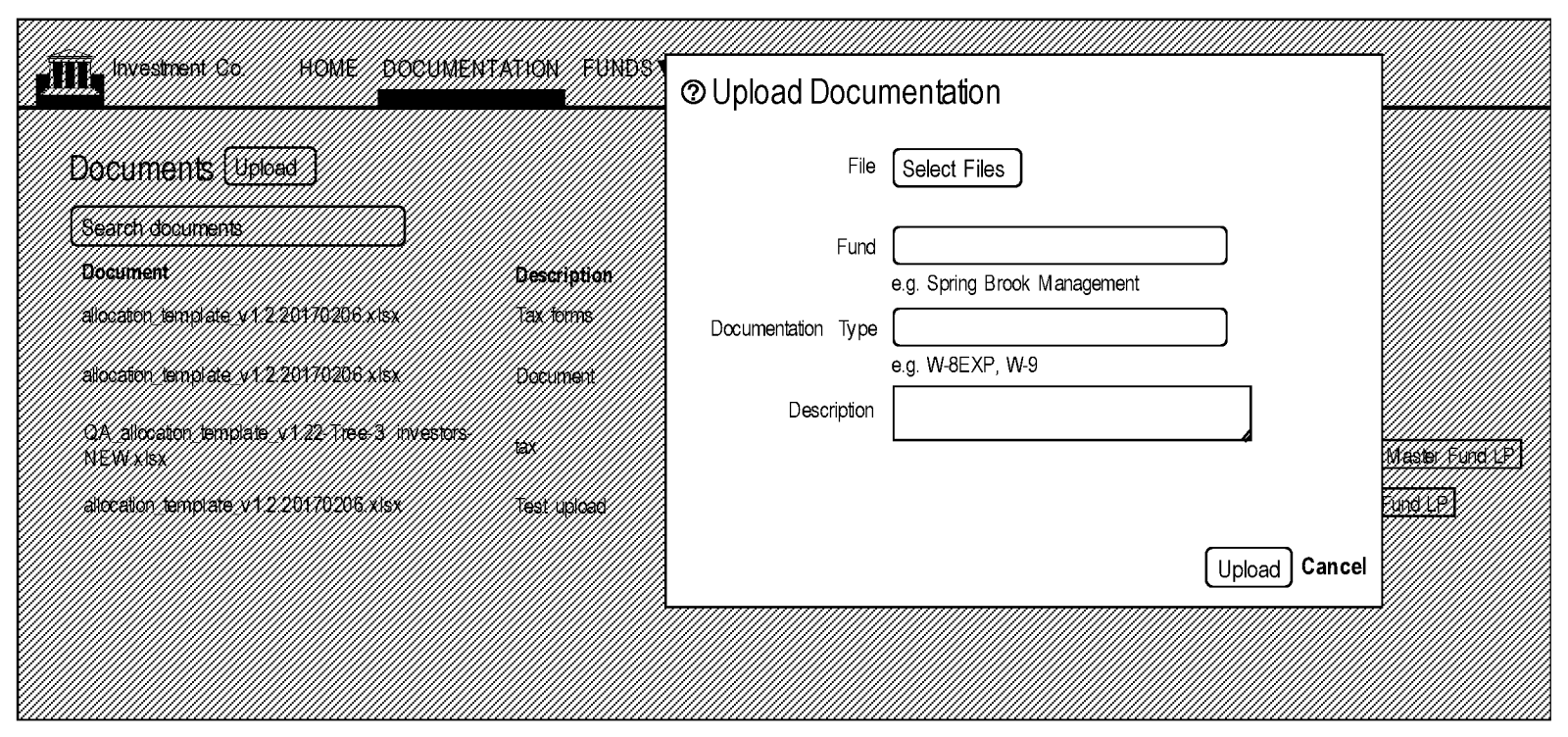

To receive the metadata and resource distribution data, the system 100 may provide a user interface, which may be referred to as a relationship management user interface. The user interface may be provided via the Internet and a child node may retrieve the relationship management user interface as a webpage. Example relationship management user interface screens are illustrates in FIGS. 6 to 9. The relationship management user interface screens provide fields or other input interfaces which allow for the input of metadata and/or relationship distribution data. For example, FIG. 6 illustrates a first relationship management user interface screen which may be used to input or display metadata associated with descendants and/or resource distribution data defining how resources associated with a child are to be allocated to descendants. FIG. 7 illustrates a second relationship management user interface screen. This second relationship management user interface screen provides a plurality of editable fields for editing metadata and resource allocation data associated with a particular descendant. A selectable interface element is provided to save or commit any changes made. FIG. 8 illustrates a third relationship management user interface screen which is similar to the first relationship management user interface screen. FIG. 9 illustrates a fourth relationship management user interface screen. In this example screen, a user interface is provided which allows for the upload of documentation such as, for example, a taxation-related form such as a W-9 form or a W-8EXP form, which are forms used in the United States. The document is uploaded in association with a particular descendant. That is, a child node uploads a document in association with a particular descendent by interacting with the fourth relationship management user interface screen and that document is received and processed at the system 100.

Referring again to FIG. 5, at operation 530, error checking may be performed by the system. The error checking may be performed in the manner described above with reference to operation 410 of the method 400 of FIG. 4. Additionally or alternatively, error checking may also be performed on the metadata to ensure the metadata satisfies predetermined criteria.

At operation 540, one or more resources may be allocated to the descendants in the manner described above with reference to operation 440 of FIG. 4. At operation 540, the system 100 may automatically and without direct user input generate a report (at operation 545) for one or more of the descendants based on the metadata for that descendant and based on the resource allocated to that descendant. For example, the report may be generated based on the hierarchical model of resource distributions. The report may, for example, be a tax report. The report may be generated by the system 100 taking into account the amount of the resource that is allocated to the descendant associated with the report, country information or other information defined in the metadata for that descendant, etc. By way of example, the report may be generated based on a capital gain realized on the sale of a tradable object and a portion of the capital gain may be allocated to a given descendent based on the relative amount of the tradable object attributable to that descendant and also based on the metadata for that descendant. The reports may only be generated for leaf nodes. That is, nodes in the hierarchical model which have descendants may be considered to be pass-through entities and an individualized report may not be generated for such nodes. Instead, reports may be generated for all leaf nodes.

Allocating resources may also include automatically processing a remittance. For example, the remittance may be a remittance associated with a tax obligation and the remittance may be processed by configuring an account to remit funds (which are in a quantum that is based on the resources that are allocated to the node for which the remittance is made). For example, a transfer of value between records in one or more databases may be configured to process the remittance.

Figure 10:
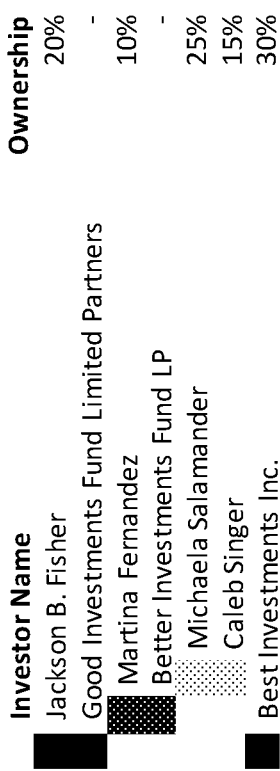
FIG. 10 is an example data structure to provide a hierarchical model of nodes.

Various techniques may be used to allow the system 100 to distinguish the pass-through entities from non-pass through entities. For example, referring to FIG. 10, an example data structure is illustrated. In the example data structure, entities in a hierarchical model (or tree structure as it is called in FIG. 10) is associated, in memory, with an identifier (ID). Some of the entities are also associated with a parent identifier (parent id) which is an identifier associated with the entity's parent. For example, an entity which is a descendant of a particular child (of the root node) has a parent identifier that is equal to the identifier of that child (of the root node i.e., of the fund itself). For example, in the example of FIG. 10, the descendants Martina Fernandez and Better Investment Fund LP both specify a parent identifier that indicates an association with Good Investments Fund Limited Partners. In order to identify the leaf nodes and to prepare reports for such nodes, the system 100 may examine the data structure to identify nodes whose identifiers (IDs) are not used as other entity's parent IDs. Such identified nodes may be determined to be leaf nodes and the system 100 may prepare an individualized report for such nodes.

After a report is generated, a signal representing the report may be transmitted, via the communications module, to the child node that is the parent for the node for which the report has been generated. For example, where a report is generated for a descendant of a child node, the report may be sent to the child node.

Figure 5:
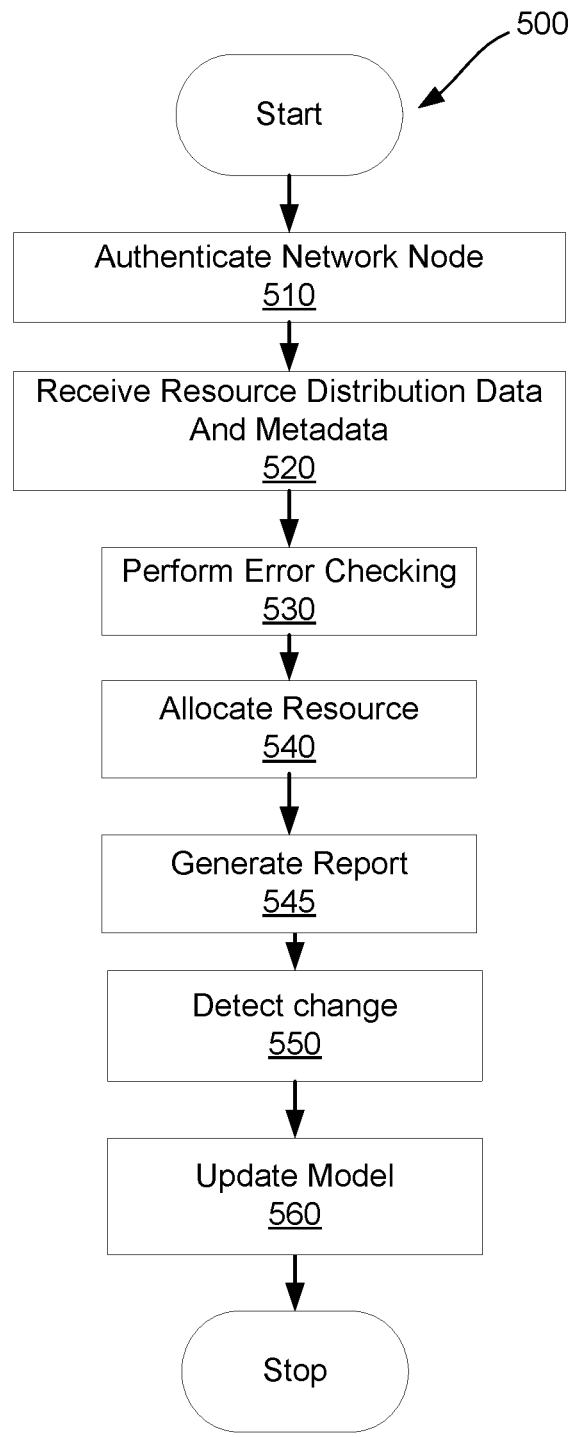
FIG. 5 is a flowchart depicting example operations performed by an electronic device to allocate a resource.

The method 500 of FIG. 5 may also include operation 550 in which a change may be detected and operation 560 in which the hierarchical model may be updated and these operations may be performed in the manner described above with reference to operations 450 and 460 of the method 400 of FIG. 4.

Variations and additions to the above-described embodiments are also contemplated. For example, in some embodiments, upper-level nodes (such as a root node, which may be implemented by the system 100) may send a signal representing a request for resources from lower-level nodes (such as child nodes and/or descendants of child nodes) and such lower-level nodes may respond with a signal representing a message indicating whether the request for resources is approved or denied. An approval of such a request may be considered to be a request for the system 100 to process remittances for the lower-level node while a denial of such a request may be considered to be a request for the system 100 to not process remittances for the lower-level node. The system 100 may perform error checking on the message and, if the message indicates that the system 100 is to process remittances, the system 100 may configure itself to process such remittances for that lower-level node while, if the message indicates that the system 100 is not to process remittances, the system 100 may configure itself to not process such remittances for that lower-level node.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted certain adaptations and modifications of the described embodiments can be made. Therefore, the above discussed embodiments are considered to be illustrative and not restrictive.

The invention claimed is:

1. A computer system for allocating a resource associated with a root node, the computer system comprising:
 a processor;
 a communications module coupled to the processor;
 a storage module coupled to the processor; and
 a memory coupled to the processor and storing instructions that, when executed by the processor, cause the computer system to:
  obtain resource distribution data, wherein the resource distribution data indicates a proportional distribution of resources among one or more descendant nodes of a child node of the root node;
  allocate the resource associated with the root node to the one or more descendant nodes of the child node by:
   determining a total amount of resources allocated to the child node,
   based on the resource distribution data, allocating respective portions from the total amount of resources allocated to the child node to the one or more descendant nodes of the child node, wherein allocating the resource to the one or more descendant nodes of the child node includes updating a hierarchical model of resource distributions based on the resource distribution data, and automatically generating reports for the one or more descendant nodes of the child node based on the hierarchical model of resource distributions; and detect a resource change in the one or more descendant nodes of the child node and, in response to detecting the resource change in the one or more descendant nodes of the child node, update the hierarchical model of resource distributions to include the resource change.

2. The computer system of claim 1, wherein determining the total amount of resources allocated to the child node comprises:

obtaining child node resource allocation data from the storage module, wherein the child node resource allocation data defines a relative amount of a pool of resources to be allocated to the child node.

3. The computer system of claim 1, wherein the resource is a computing resource associated with the root node.

4. The computer system of claim 3, wherein the resource is one or more of a processing resource or a memory resource.

5. The computer system of claim 1, wherein the instructions, when executed by the processor, further cause the computer system to perform error checking on the resource distribution data.

6. The computer system of claim 5, wherein performing error checking on the resource distribution data comprises determining that the resource distribution data provides a complete assignment of resources.

7. The computer system of claim 1, wherein the resource is a tradeable object.

8. The computer system of claim 1, wherein the automatically generated reports indicate tax liabilities associated with the one or more descendant nodes of the child node.

9. The computer system of claim 1, wherein the instructions, when executed by the processor, further cause the computer system to:

detect availability of a new resource, removal of an existing resource, or a change in a total amount of an existing resource and, in response to detecting availability of the new resource, removal of the existing resource, or the change in the total amount of the existing resource, update the hierarchical model of resource distributions.

10. The computer system of claim 1, wherein allocating respective portions from the total amount of resources allocated to the child node to the one or more descendant nodes of the child node includes allocating based on the updated hierarchical model of resource distributions.

11. The computer system of claim 1, wherein automatically generating reports for the one or more descendant nodes of the child node includes automatically generating reports only for leaf nodes that do not have descendants.

12. A method for allocating a resource associated with a root node, the method comprising:

obtaining resource distribution data, wherein the resource distribution data indicates a proportional distribution of resources among one or more descendant nodes of a child node of the root node;

allocating the resource associated with the root node to the one or more descendant nodes of the child node by:

determining a total amount of resources allocated to the child node, based on the resource distribution data, allocating respective portions from the total amount of resources allocated to the child node to the one or more descendant nodes of the child node, wherein allocating the resource to the one or more descendant nodes of the child node includes updating a hierarchical model of resource distributions based on the resource distribution data, and automatically generating reports for the one or more descendant nodes of the child node based on the hierarchical model of resource distributions; and detecting a resource change in the one or more descendant nodes of the child node and, in response to detecting the resource change in the one or more descendant nodes of the child node, updating the hierarchical model of resource distributions to include the resource change.

13. The method of claim 12, wherein determining the total amount of resources allocated to the child node comprises:

obtaining child node resource allocation data from a storage module, wherein the child node resource allocation data defines a relative amount of a pool of resources to be allocated to the child node.

14. The method of claim 12, wherein the resource is a computing resource associated with the root node.

15. The method of claim 14, wherein the resource is one or more of a processing resource or a memory resource.

16. The method of claim 12, further comprising performing error checking on the resource distribution data.

17. The method of claim 16, wherein performing error checking on the resource distribution data comprises determining that the resource distribution data provides a complete assignment of resources.

18. The method of claim 12, wherein the automatically generated reports indicate tax liabilities associated with the one or more descendant nodes of the child node.

19. The method of claim 12, further comprising:

detecting availability of a new resource, removal of an existing resource, or a change in a total amount of an existing resource and, in response to detecting availability of the new resource, removal of the existing resource, or the change in the total amount of the existing resource, updating the hierarchical model of resource distributions.

20. The method of claim 12, wherein allocating respective portions from the total amount of resources allocated to the child node to the one or more descendant nodes of the child node includes allocating based on the updated hierarchical model of resource distributions.

21. The method of claim 12, wherein automatically generating reports for the one or more descendant nodes of the child node includes automatically generating reports only for leaf nodes that do not have descendants.

22. A non-transitory computer-readable storage medium storing instructions that, when executed by a processor of a computer system, cause the computer system to:

obtain resource distribution data, wherein the resource distribution data indicates a proportional distribution of resources among one or more descendant nodes of a child node of a root node;

allocate a resource associated with the root node to the one or more descendant nodes of the child node by:

determining a total amount of resources allocated to the child node, based on the resource distribution data, allocating respective portions from the total amount of resources allocated to the child node to the one or more descendant nodes of the child node, wherein allocating the resource to the one or more descendant nodes of the child node includes updating a hierarchical model of resource distributions based on the resource distribution data, and automatically generating reports for the one or more descendant nodes of the child node based on the hierarchical model of resource distributions; and detect a resource change in the one or more descendant nodes of the child node and, in response to detecting the resource change in the one or more descendant nodes of the child node, update the hierarchical model of resource distributions to include the resource change.

\* \* \* \* \*